(12) United States Patent
Foster, Sr.

(10) Patent No.: US 7,711,886 B2
(45) Date of Patent: May 4, 2010

(54) DYNAMICALLY ALLOCATING COMMUNICATION LANES FOR A PLURALITY OF INPUT/OUTPUT ('I/O') ADAPTER SOCKETS IN A POINT-TO-POINT, SERIAL I/O EXPANSION SUBSYSTEM OF A COMPUTING SYSTEM

(75) Inventor: Jimmy G. Foster, Sr., Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 11/956,026

(22) Filed: Dec. 13, 2007

(65) Prior Publication Data

US 2009/0157920 A1 Jun. 18, 2009

(51) Int. Cl.
*G06F 13/20* (2006.01)
*G06F 13/40* (2006.01)
(52) U.S. Cl. .................. 710/313; 710/307
(58) Field of Classification Search .......... 710/20, 710/307, 313
See application file for complete search history.

(56) References Cited

U.S. PATENT DOCUMENTS

| | | | |
|---|---|---|---|
| 6,434,654 B1 | 8/2002 | Story et al. | |
| 7,058,738 B2 | 6/2006 | Stufflebeam, Jr. | |
| 7,099,969 B2 | 8/2006 | McAfee et al. | |
| 7,136,953 B1 * | 11/2006 | Bisson et al. | 710/307 |
| 7,174,411 B1 * | 2/2007 | Ngai | 710/316 |
| 7,325,086 B2 * | 1/2008 | Kong et al. | 710/307 |
| 7,447,824 B2 * | 11/2008 | Jabori et al. | 710/307 |
| 7,447,825 B2 * | 11/2008 | Chen | 710/307 |
| 7,474,992 B2 * | 1/2009 | Ariyur | 702/190 |
| 2006/0112210 A1 * | 5/2006 | Tseng | 710/307 |
| 2006/0271713 A1 | 11/2006 | Xie et al. | |
| 2006/0294279 A1 | 12/2006 | McKee et al. | |
| 2007/0038794 A1 | 2/2007 | Purcell et al. | |

(Continued)

OTHER PUBLICATIONS

Venkata Krishnan (Dolphin Inc.), "Towards an Integrated IO and Clustering Solution using PCI Express," pp. 259-266, IEEE, Copyright 2007.*

(Continued)

*Primary Examiner*—Alan Chen
*Assistant Examiner*—Dayton Lewis-Taylor
(74) *Attorney, Agent, or Firm*—John Biggers; Cynthia G. Seal; Biggers & Ohanian LLP.

(57) ABSTRACT

Methods, systems, and products are disclosed for dynamically allocating communication lanes for a plurality of sockets in a point-to-point, serial I/O expansion subsystem of a computing system, the expansion subsystem including an switch that supports a maximum number of enabled communication lanes, each socket having a same form factor, each socket connected to the switch using a same predefined number of communication lanes, that include: identifying, during a boot process for the computing system, each of the sockets in which an adapter is installed; determining, for each installed adapter, a maximum link width for that adapter; and enabling, for each of the sockets in which an adapter is installed, a set of communication lanes for communications between the adapter installed in that socket and the expansion subsystem switch in dependence upon the maximum link width for each adapter and the maximum number of enabled communication lanes supported by the switch.

15 Claims, 10 Drawing Sheets

U.S. PATENT DOCUMENTS

2007/0067541 A1   3/2007   Chang

OTHER PUBLICATIONS

PCI Express Base Specification, Revision 1.0a, Oct. 28, 2004, pp. 1-123.*

Henry Ngai (Pericom Semiconductor Corp.), "Lane Routing in PCI Express," Embedded Computing Design Annual Product Directory, pp. 1-3, Sep. 2005.* http://www.us.design-reuse.com/news/?id=15545&print=yes.

* cited by examiner

DYNAMICALLY ALLOCATING COMMUNICATION LANES FOR A PLURALITY OF INPUT/OUTPUT ('I/O') ADAPTER SOCKETS IN A POINT-TO-POINT, SERIAL I/O EXPANSION SUBSYSTEM OF A COMPUTING SYSTEM

BACKGROUND OF THE INVENTION

1. Field of the Invention

The field of the invention is data processing, or, more specifically, methods, apparatus, and products for dynamically allocating communication lanes for a plurality of input/output ('I/O') adapter sockets in a point-to-point, serial I/O expansion subsystem of a computing system such as, for example, a PCI Express expansion subsystem.

2. Description of Related Art

A PCI Express ('PCIe') expansion subsystem is an implementation of the Peripheral Components Interconnect ('PCI') expansion subsystem according to the set of PCIe specifications promulgated by the PCI Special Interest Group ('PCI SIG'). A PCIe expansion subsystem uses existing PCI programming and software concepts, but is based on a different and much faster serial physical-layer communications protocol. The physical-layer consists not of a bus, but of a network of serial interconnections extending to each device from a switch. The switch provides point-to-point communications between devices connected to the switch. These devices may be I/O adapters or other switches. I/O adapters and switches operating according to the PCIe specifications are generally referred to as 'PCIe adapters' and 'PCIe switches' respectively, and any device, whether an I/O adapter or a switch, operating according to the PCIe specifications is generally referred to as 'PCIe device.'

A connection between any two PCIe devices is referred to as a 'link.' A link consists of a collection of one or more lanes used for data communications between devices. In a PCIe expansion subsystem, each lane is a set of two unidirectional low voltage differential signaling pairs of transmission pathways such as, for example, traces along a motherboard. Because transmitting data and receiving data are implemented using separate differential pairs, each lane allows for dual-simplex serial data communication of up to five gigabits of data per second.

All PCIe adapters must minimally support single-lane links. PCIe adapters may optionally support wider links composed of two, four, eight, twelve, sixteen, or thirty-two lanes by providing additional pins on the hardware interface of the device that plug into a PCIe adapter socket. A PCIe adapter socket is an I/O adapter socket manufactured according to the PCIe specifications and may physically support connections for one, two, four, eight, twelve, sixteen, or thirty-two lanes in a manner similar to PCIe adapters. A PCIe adapter may be physically inserted into any PCIe adapter socket that supports the same or a greater number of lanes as the lanes supported by the PCIe adapter. For example, a PCIe adapter physically supporting eight lanes may be installed in to a PCIe adapter socket physically supporting eight, twelve, sixteen, or thirty-two lanes. Such an eight lane PCIe adapter, however, cannot be physically installed in a one, two, or four lane PCIe adapter socket.

Although a PCIe adapter and the PCIe adapter socket into which the adapter is installed may physically support links with up to thirty-two lanes, a PCIe adapter may utilize fewer lanes for data communication than the maximum number of lanes physically supported by the adapter and the adapter socket. For example, a PCIe adapter may physically support eight lanes and be installed in a PCIe adapter socket physically supporting sixteen lanes. The eight lane PCIe adapter may, however, only utilize one, two, or four of those eight lanes it supports for data communications with other PCIe devices. The number of lanes actually utilized for the data communications link between two devices is typically the highest number of lanes mutually supported by the PCIe adapter and the other PCIe device.

The current chipsets implementing the PCIe switch that provides the point-to-point communications between devices support only a fixed number of communications lanes. Because different computing systems typically have different I/O adapter requirements, the manner in which a chipset allocates communications lanes among PCIe adapter sockets may vary from system to system. For example consider that the PCIe switch supports only seventeen communication lanes. In a workstation, these lanes provided by the PCIe switch are typically connected to two PCIe connectors: a sixteen lane connector and a one lane connector. Often, a high end video graphics adapter is installed in the sixteen lane PCIe connector and some other PCIe device is installed in the one lane PCIe connector. Such a configuration works well in computer systems where the performance of the video graphics adapter is most important. In other computing systems, however, other allocations of the seventeen physical lanes may be preferred. In a server system, for example, allocating the seventeen lanes to three or more PCIe connectors may be preferred to provide the server system with one connector for installing a video adapter and two or more connectors to provide redundant network adapters or redundant storage drive adapters. That is, in the server configuration, computer architects prefer to have more PCIe connectors connecting to the switch that provide redundancy over the workstation configuration that provides a single high-bandwidth PCIe connector. Although the same chipset is used to implement the seventeen lane PCIe switch in either the workstation or the server configuration, the number of PCIe connectors and the electrical connections between the connectors and the switch are different for the workstation configuration and the server configuration. Because of the contrasting requirements of these two configurations, these two configurations cannot currently be supported by the same motherboard configuration. Rather, two separate motherboards with two distinct configurations must be designed and manufactured to support both of the above configurations.

SUMMARY OF THE INVENTION

Method, apparatus, and computer program products for dynamically allocating communication lanes for a plurality of input/output ('I/O') adapter sockets in a point-to-point, serial I/O expansion subsystem of a computing system, the point-to-point, serial I/O expansion subsystem including an expansion subsystem switch that supports a maximum number of enabled communication lanes, each I/O adapter socket having a same form factor, each I/O adapter socket connected to the expansion subsystem switch using a same predefined number of communication lanes, that include: identifying, by a lane configuration module during a boot process for the computing system, each of the I/O adapter sockets in which an I/O adapter is installed; determining, by the lane configuration module for each installed I/O adapter, a maximum link width for that I/O adapter; and enabling, by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
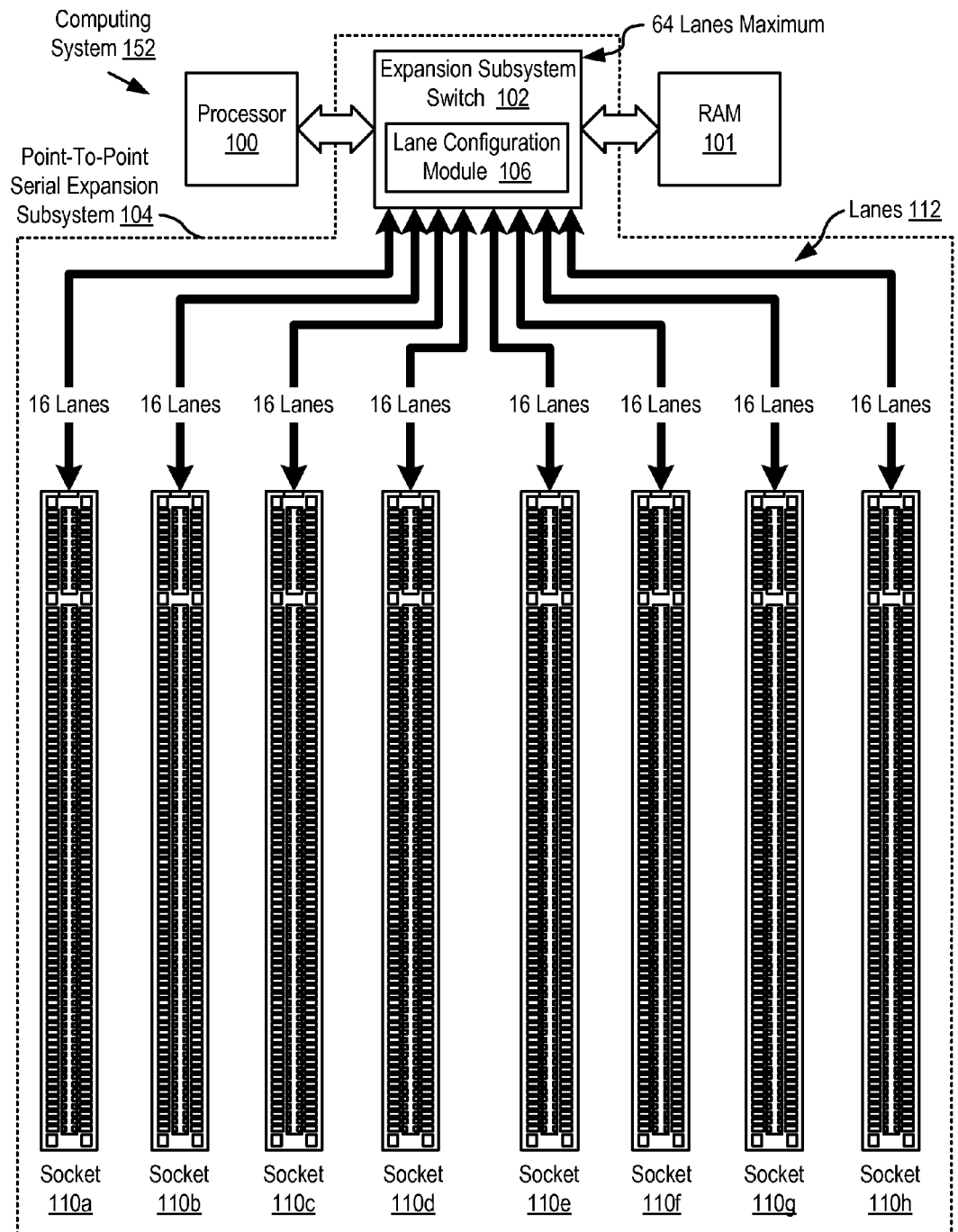
FIG. 1 sets forth a block diagram illustrating an exemplary system for dynamically allocating communication lanes for a plurality of I/O adapter sockets in a point-to-point, serial I/O expansion subsystem of a computing system according to embodiments of the present invention.

Exemplary methods, systems, and products for dynamically allocating communication lanes for a plurality of I/O adapter sockets in a point-to-point, serial I/O expansion subsystem of a computing system according to embodiments of the present invention are described with reference to the accompanying drawings, beginning with FIG. 1. FIG. 1 sets forth a block diagram illustrating an exemplary system for dynamically allocating communication lanes (112) for a plurality of I/O adapter sockets (110) in a point-to-point, serial I/O expansion subsystem (104) of a computing system (152) according to embodiments of the present invention. All of the components in the exemplary system of FIG. 1 are installed upon a motherboard of a computing system (152).

The point-to-point, serial I/O expansion subsystem (104) of FIG. 1 is an expansion adapter architecture that utilizes a switch (102) to route data communications between subsystem components connected to the switch through dedicated, serial communication links. Each dedicated, serial communication link is composed of a scalable number of physical communication lanes (112). A point-to-point, serial I/O expansion subsystem may be implemented as an I/O expansion subsystem according to the PCIe family of specifications and improved according to embodiments of the present invention. Readers will note, however, that point-to-point, serial I/O expansion subsystems implemented according to PCIe specifications are for explanation only and not for limitation. In fact, dynamically allocating communication lanes for a plurality of I/O adapter sockets in a point-to-point, serial I/O expansion subsystem of a computing system according to embodiments of the present invention may also be implemented using other improved point-to-point, serial I/O expansion subsystems implemented, for example, according to specifications for InfiniBand™, RapidIO™, HyperTransport™, and so on.

In the example of FIG. 1, a communication lane (112) is a physical communications channel between an expansion subsystem's switch (102) and an I/O adapter socket (110). For example, according to PCIe specifications, a lane is a set of two unidirectional low voltage differential signaling pairs of transmission pathways such as, for example, traces along a motherboard. In the example of FIG. 1, each I/O adapter socket (110) is connected to the expansion subsystem switch (102) using the same predefined number of communication lanes (112), specifically sixteen communication lanes. The predefined number of communication lanes (112) provided to each I/O adapter socket (110) depends on the form factor for the sockets (110). In the example of FIG. 1, because sixteen lane I/O adapter sockets (110) are utilized, sixteen lanes are used to connect each socket (110) to the switch (102).

The exemplary system of FIG. 1 includes a plurality of I/O adapter sockets (110) in which I/O adapters may be installed. An I/O adapter is referred to as 'installed' in an I/O adapter socket when the I/O adapter is plugged into the socket and electrically connects to at least one lane provided by the socket. In the example of FIG. 1, each I/O adapter socket (110) has the same form factor. The 'form factor' for each I/O adapter socket refers to the socket's physical configuration. In the example of FIG. 1, each I/O adapter socket (110) has the same form factor in that each I/O adapter socket is capable of physically accepting I/O adapters supporting sixteen communication lanes.

In the exemplary system of FIG. 1, the expansion subsystem switch (102) connects to a computer processor (100), random access memory ('RAM') (101), and various other components of the computing system (152). The expansion subsystem switch (102) of FIG. 1 is a computer hardware chipset that handles communications between the components of a computer system such as, for example, a computer processor, RAM, non-volatile memory, power management components, the real-time system clock, I/O adapters, and so on.

The expansion subsystem switch (102) of FIG. 1 communicates with I/O adapters installed in the I/O adapter sockets (110) using communication lanes (112). Although sixteen communications lanes extend from the switch (102) to each of the I/O adapter sockets (110) for a total of 128 lanes, the expansion subsystem switch (102) of FIG. 1 supports a maximum number of sixty-four enabled communication lanes. During operation of the computing system (152), therefore, at most sixty-four of the lanes (112) are enabled, and at least sixty-four of the lanes (112) are disabled. An enabled lane refers to a lane between an expansion subsystem switch and an I/O adapter socket that is configured to provide communications channel between the switch and an I/O adapter installed in the I/O adapter socket. A disabled lane refers to a lane between an expansion subsystem switch and an I/O adapter socket that is not configured to provide communications channel between the switch and an I/O adapter installed in the I/O adapter socket. That is, a disabled communications lane is not used for communications between the switch and an I/O adapter installed in the I/O adapter socket.

A lane configuration module (106) installed upon the expansion subsystem switch (102) determines whether lanes (112) are enabled or disabled. The lane configuration module (106) of FIG. 1 is a set of computer program instructions for dynamically allocating communication lanes for a plurality of I/O adapter sockets in a point-to-point, serial I/O expansion subsystem of a computing system according to embodiments of the present invention. The lane configuration module (106) of FIG. 1 operates generally for dynamically allocating communication lanes for a plurality of I/O adapter sockets in a point-to-point, serial I/O expansion subsystem of a computing system according to embodiments of the present invention by: identifying, during a boot process for the computing system (152), each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102). The maximum link width for an I/O adapter is the maximum number of communication lanes in a link that the I/O adapter is capable of supporting with the switch (102).

The term 'boot process' in this specification refers to a process of executing computer program instructions from the time that the computing system (152) is initially powered on or restarted until an operating system loads. During the boot process, a Power On Self Test ('POST') is typically performed and the Basic Input/Output System ('BIOS') identifies and initializes hardware components such as, for example, hard drives, CDs, bus adapters, chipsets, and so on, so that other software programs stored on various media can load, execute, and assume control of the computing system (152).

Figure 2:
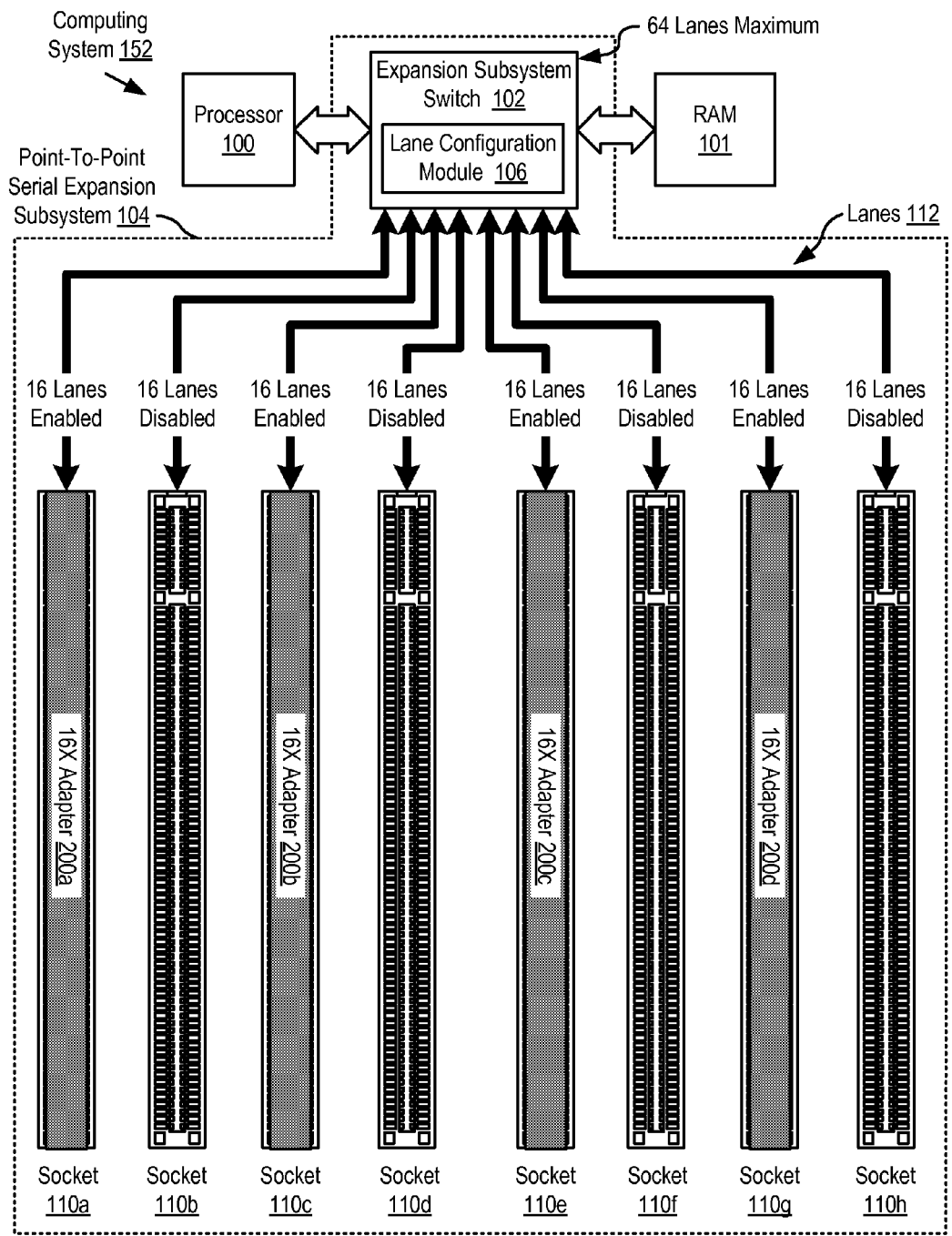
FIG. 2 sets forth a block diagram illustrating a further exemplary system for dynamically allocating communication lanes for a plurality of I/O adapter sockets in a point-to-point, serial I/O expansion subsystem of a computing system according to embodiments of the present invention.

For further explanation of dynamically allocating communication lanes to a plurality of I/O adapter sockets, FIG. 2 sets forth a block diagram illustrating a further exemplary system for dynamically allocating communication lanes (112) for a plurality of I/O adapter sockets (110) in a point-to-point, serial I/O expansion subsystem (104) of a computing system (152) according to embodiments of the present invention. The system of FIG. 2 is similar to the system of FIG. 1. In the exemplary system of FIG. 2, the serial I/O expansion subsystem (104) includes an expansion subsystem switch (102) that supports a maximum number of sixty-four enabled communication lanes and is connected to processor (100) and RAM (101). Each I/O adapter socket (110) has a same form factor, supporting sixteen lane I/O adapters. Because each I/O adapter socket (110) supports sixteen lane I/O adapters, each I/O adapter socket (110) is connected to the expansion subsystem switch (102) using a predefined number of sixteen communication lanes.

In the exemplary system of FIG. 2, the expansion subsystem switch (102) has installed upon it a lane configuration module (106). The lane configuration module (106) of FIG. 1 operates generally for dynamically allocating communication lanes for a plurality of I/O adapter sockets in a point-to-point, serial I/O expansion subsystem of a computing system according to embodiments of the present invention by: identifying, during a boot process for the computing system (152), each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102).

In the example of FIG. 2, four sixteen lane I/O adapters (200) are installed in I/O adapter sockets (110). Specifically, I/O adapter (200a) is installed in socket (110a), I/O adapter (200b) is installed in socket (110c), I/O adapter (200c) is installed in socket (110e), and I/O adapter (200d) is installed in socket (110g). Because there are four I/O adapters (200) and the maximum link width of each of the I/O adapters (200) is sixteen lanes, the I/O adapters (200) may utilize a maximum of sixty-four lanes to communicate with the expansion subsystem switch (102). Furthermore, because the switch (102) supports a maximum number of sixty-four enabled communication lanes, the lane configuration module (106) is able to allocate enough lanes to each of the sockets (110) to support the maximum link width of each of the I/O adapters (200) installed in the sockets (110). Specifically, the lane configuration module (106) enables sixteen lanes from the switch (102) to the socket (110a), enables sixteen lanes from the switch (102) to the socket (110c), enables sixteen lanes from the switch (102) to the socket (110e), and enables sixteen lanes from the switch (102) to the socket (110g). The remaining sixty-four lanes from the switch (102) to the sockets (110) are disabled. Specifically, the lane configuration module (106) disables sixteen lanes from the switch (102) to the socket (110b), disables sixteen lanes from the switch (102) to the socket (110d), disables sixteen lanes from the switch (102) to the socket (110f), and disables sixteen lanes from the switch (102) to the socket (110h).

FIG. 2 illustrates four sixteen lane I/O adapters installed in the I/O adapter sockets of a computing system that dynamically allocates communication lanes for the I/O adapter sockets in a point-to-point, serial I/O expansion subsystem according to embodiments of the present invention. Readers will note, however, that a variety of other configurations may be supported in addition to the configuration illustrated in FIG. 2. For further explanation, therefore, FIG. 3 sets forth a block diagram illustrating a further exemplary system for dynamically allocating communication lanes (112) for a plurality of I/O adapter sockets (110) in a point-to-point, serial I/O expansion subsystem (104) of a computing system (152) according to embodiments of the present invention.

Figure 3:
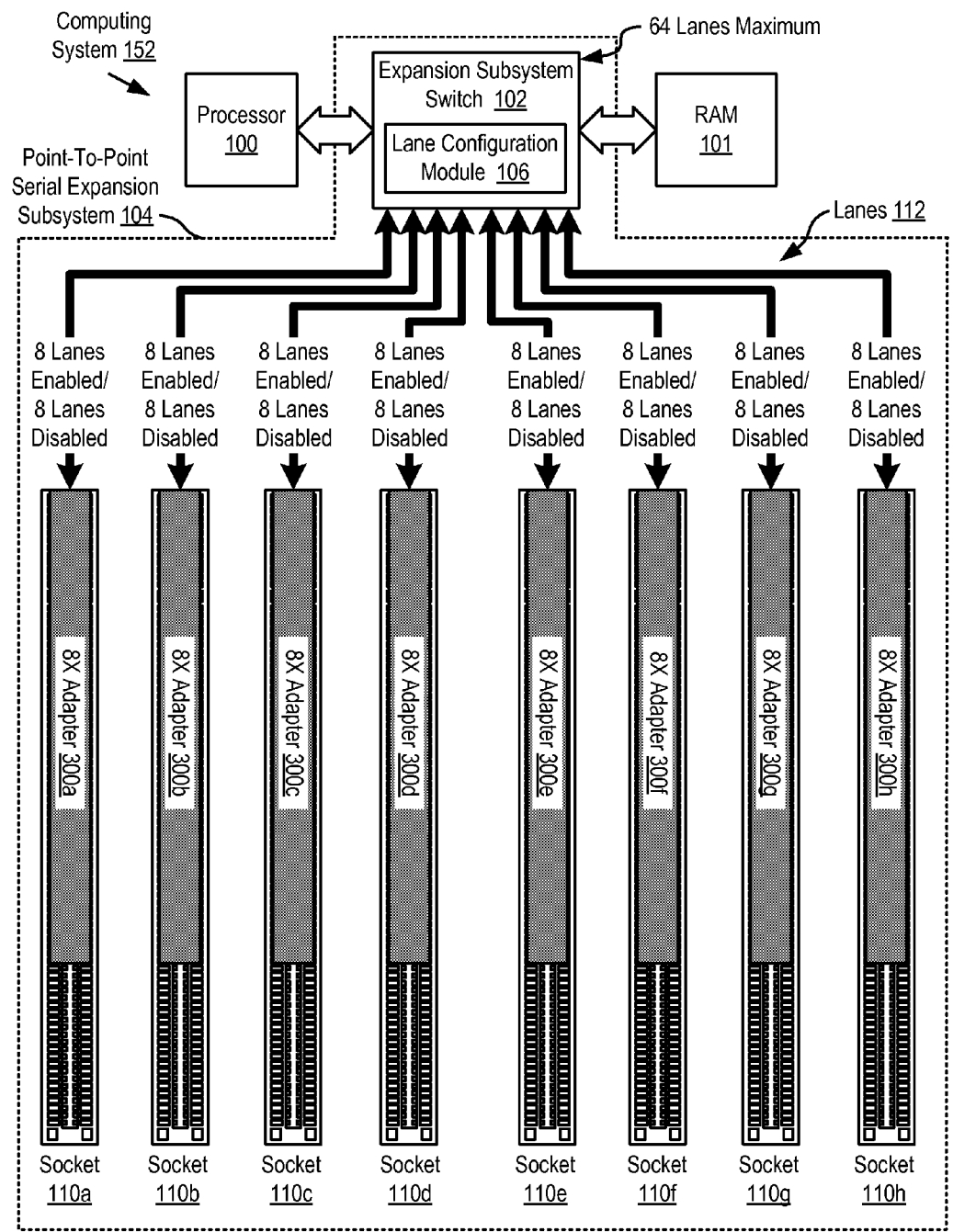
FIG. 3 sets forth a block diagram illustrating a further exemplary system for dynamically allocating communication lanes for a plurality of I/O adapter sockets in a point-to-point, serial I/O expansion subsystem of a computing system according to embodiments of the present invention.

The system of FIG. 3 is similar to the system of FIG. 1. In the exemplary system of FIG. 3, the serial I/O expansion subsystem (104) includes an expansion subsystem switch (102) that supports a maximum number of sixty-four enabled communication lanes and is connected to processor (100) and RAM (101). Each I/O adapter socket (110) has a same form factor, supporting sixteen lane I/O adapters. Because each I/O adapter socket (110) supports sixteen lane I/O adapters, each I/O adapter socket (110) is connected to the expansion subsystem switch (102) using a predefined number of sixteen communication lanes.

In the exemplary system of FIG. 3, the expansion subsystem switch (102) has installed upon it a lane configuration module (106). The lane configuration module (106) of FIG. 1 operates generally for dynamically allocating communication lanes for a plurality of I/O adapter sockets in a point-to-point, serial I/O expansion subsystem of a computing system according to embodiments of the present invention by: identifying, during a boot process for the computing system (152), each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102).

In the example of FIG. 3, eight eight lane I/O adapters (300) are installed in I/O adapter sockets (110). Specifically, I/O adapter (300a) is installed in socket (110a), I/O adapter (300b) is installed in socket (110b), I/O adapter (300c) is installed in socket (110c), I/O adapter (300d) is installed in socket (110d), I/O adapter (300e) is installed in socket (110e), I/O adapter (300f) is installed in socket (110f), I/O adapter (300g) is installed in socket (110g), and I/O adapter (300h) is installed in socket (110h). Because there are eight I/O adapters (300) and the maximum link width of each of the I/O adapters (300) is eight lanes, the I/O adapters (300) may utilize a maximum of sixty-four lanes to communicate with the expansion subsystem switch (102). Furthermore, because the switch (102) supports a maximum number of sixty-four enabled communication lanes, the lane configuration module (106) is able to allocate enough lanes to each of the sockets (110) to support the maximum link width of each of the I/O adapters (300) installed in the sockets (110). Specifically, the lane configuration module (106) enables eight lanes and disables eight lanes from the switch (102) to the socket (110a), enables eight lanes and disables eight lanes from the switch (102) to the socket (110b), enables eight lanes and disables eight lanes from the switch (102) to the socket (110c), enables eight lanes and disables eight lanes from the switch (102) to the socket (110d), enables eight lanes and disables eight lanes from the switch (102) to the socket (110e), enables eight lanes and disables eight lanes from the switch (102) to the socket (110f), enables eight lanes and disables eight lanes from the switch (102) to the socket (110g), and enables eight lanes and disables eight lanes from the switch (102) to the socket (110h).

While FIGS. 2 and 3 illustrates adapters having the same maximum link width being installed in I/O adapter sockets of a computing system that dynamically allocates communication lanes for the I/O adapter socket in a point-to-point, serial I/O expansion subsystem according to embodiments of the present invention, readers will note that a variety of other configurations may be supported in addition to the configuration illustrated in FIG. 2. For further explanation, therefore, FIG. 4 sets forth a block diagram illustrating a further exemplary system for dynamically allocating communication lanes (112) for a plurality of I/O adapter sockets (110) in a point-to-point, serial I/O expansion subsystem (104) of a computing system (152) according to embodiments of the present invention.

Figure 4:
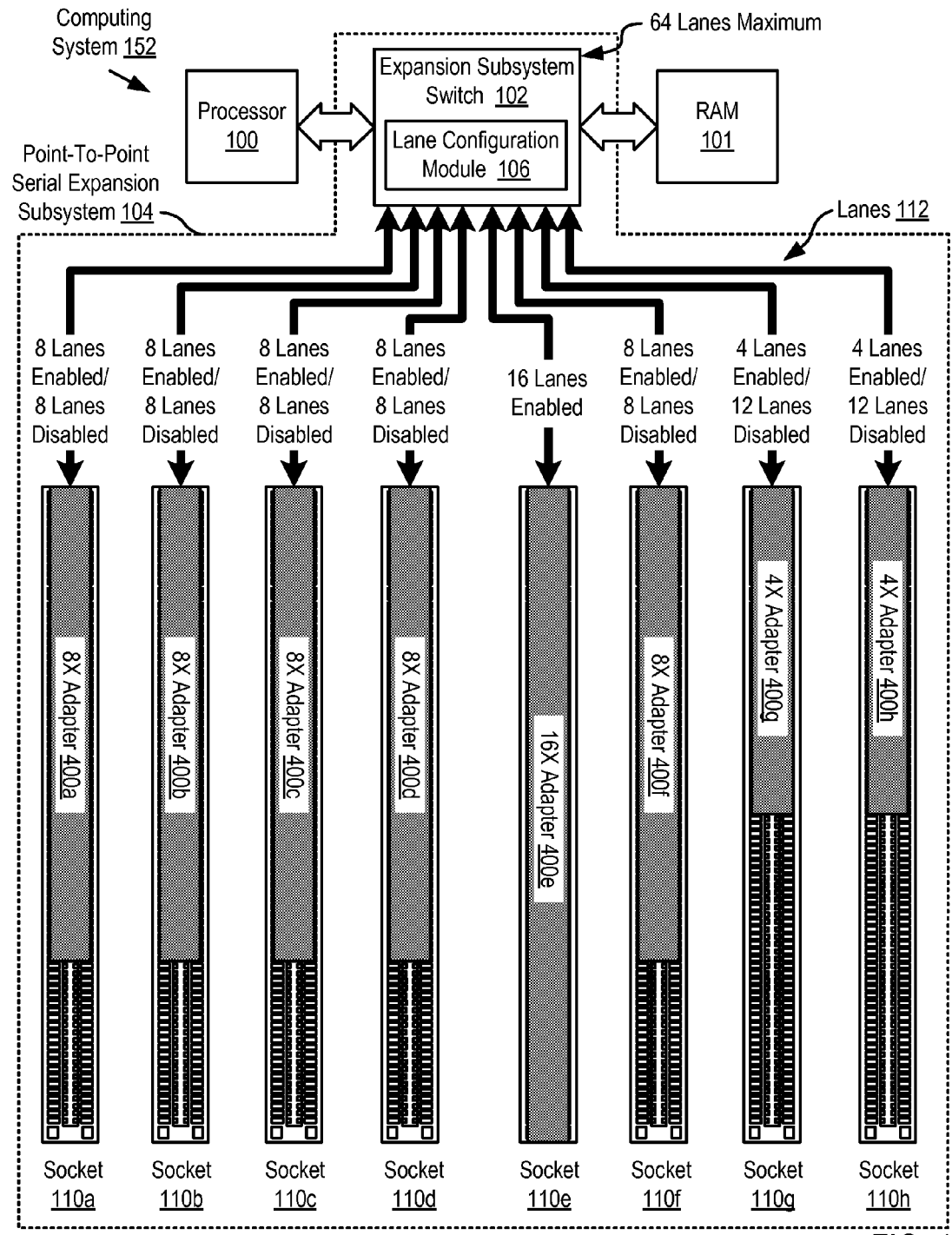
FIG. 4 sets forth a block diagram illustrating a further exemplary system for dynamically allocating communication lanes for a plurality of I/O adapter sockets in a point-to-point, serial I/O expansion subsystem of a computing system according to embodiments of the present invention.

The system of FIG. 4 is similar to the system of FIG. 1. In the exemplary system of FIG. 4, the serial I/O expansion subsystem (104) includes an expansion subsystem switch (102) that supports a maximum number of sixty-four enabled communication lanes and is connected to processor (100) and RAM (101). Each I/O adapter socket (110) has a same form factor, supporting sixteen lane I/O adapters. Because each I/O adapter socket (110) supports sixteen lane I/O adapters, each I/O adapter socket (110) is connected to the expansion subsystem switch (102) using a predefined number of sixteen communication lanes.

In the exemplary system of FIG. 4, the expansion subsystem switch (102) has installed upon it a lane configuration module (106). The lane configuration module (106) of FIG. 1 operates generally for dynamically allocating communication lanes for a plurality of I/O adapter sockets in a point-to-point, serial I/O expansion subsystem of a computing system according to embodiments of the present invention by: identifying, during a boot process for the computing system (152), each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102).

In the example of FIG. 4, five eight lane I/O adapters, one sixteen lane I/O adapter, and two four lane I/O adapters are installed in I/O adapter sockets (110). Specifically, eight lane I/O adapter (400a) is installed in socket (110a), eight lane I/O adapter (400b) is installed in socket (110b), eight lane I/O adapter (400c) is installed in socket (110c), eight lane I/O adapter (400d) is installed in socket (110d), sixteen lane I/O adapter (400e) is installed in socket (110e), eight lane I/O adapter (400f) is installed in socket (110f), four lane I/O adapter (400g) is installed in socket (110g), and four lane I/O adapter (400h) is installed in socket (110h). Because sum of the maximum link width for each of the I/O adapters (400) is sixty-four lanes and because the switch (102) supports a maximum number of sixty-four enabled communication lanes, the lane configuration module (106) is able to allocate enough lanes to each of the sockets (110) to support the maximum link width of each of the I/O adapters (400) installed in the sockets (110). Specifically, the lane configuration module (106) enables eight lanes and disables eight lanes from the switch (102) to the socket (110a), enables eight lanes and disables eight lanes from the switch (102) to the socket (110b), enables eight lanes and disables eight lanes from the switch (102) to the socket (110c), enables eight lanes and disables eight lanes from the switch (102) to the socket (110d), enables all sixteen lanes from the switch (102) to the socket (110e), enables eight lanes and disables eight lanes from the switch (102) to the socket (110f), enables four lanes and disables twelve lanes from the switch (102) to the socket (110g), and enables four lanes and disables twelve lanes from the switch (102) to the socket (110h).

In the examples of FIGS. 2, 3, and 4 above, the sum of the maximum link width for each of the I/O adapters installed in the sockets matched the maximum number of enabled communication lanes supported by the expansion subsystem switch. Readers will note, however, that in some embodiments, the sum of the maximum link width for each of the I/O adapters installed in the sockets may exceed the maximum number of enabled communication lanes supported by the expansion subsystem switch. In such embodiments, the lane configuration module may dynamically allocate lanes proportionately among each I/O adapter socket. For further explanation, therefore, FIG. 5 sets forth a block diagram illustrating a further exemplary system for dynamically allocating communication lanes (112) for a plurality of I/O adapter sockets (110) in a point-to-point, serial I/O expansion subsystem (104) of a computing system (152) according to embodiments of the present invention.

Figure 5:
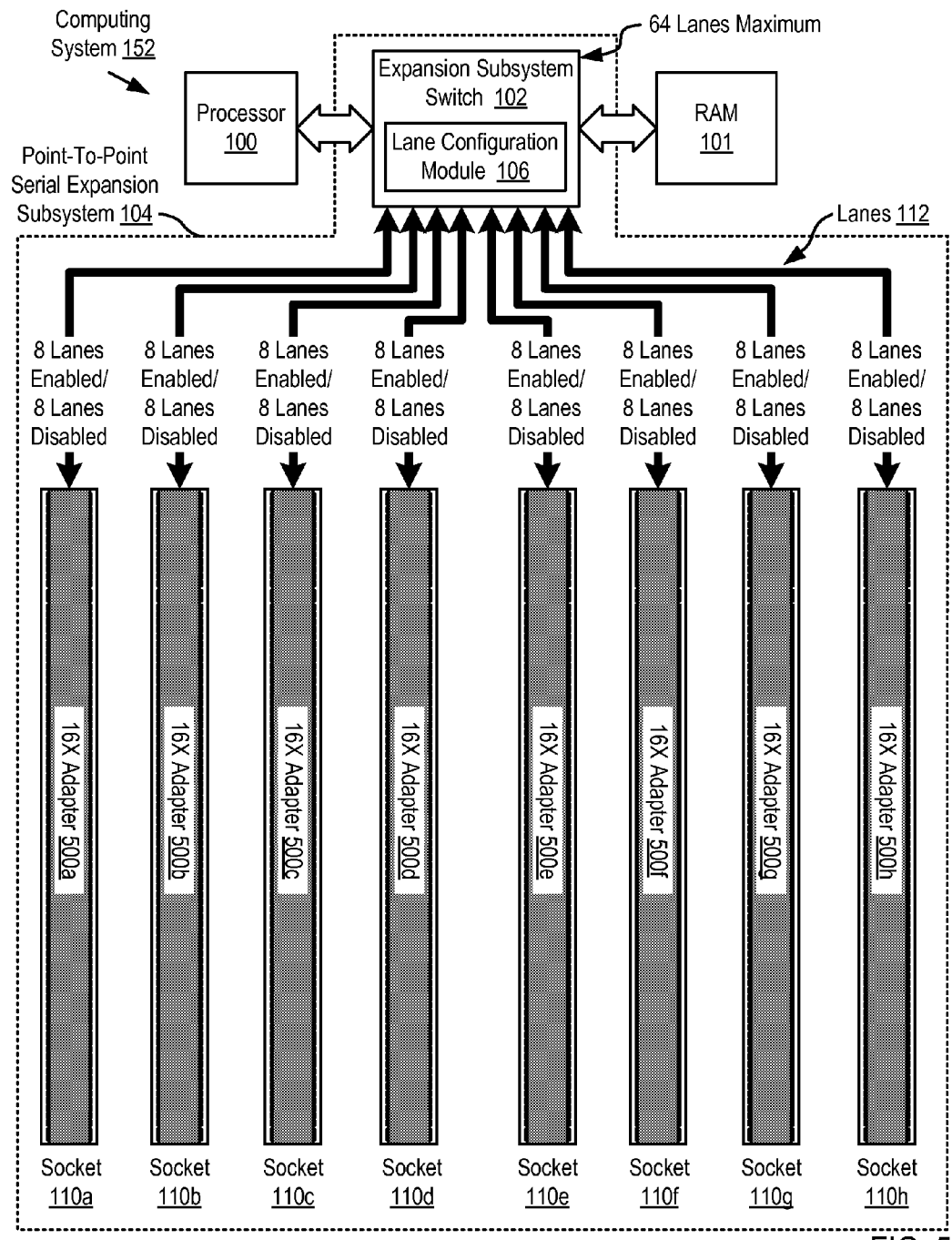
FIG. 5 sets forth a block diagram illustrating a further exemplary system for dynamically allocating communication lanes for a plurality of I/O adapter sockets in a point-to-point, serial I/O expansion subsystem of a computing system according to embodiments of the present invention.

The system of FIG. 5 is similar to the system of FIG. 1. In the exemplary system of FIG. 5, the serial I/O expansion subsystem (104) includes an expansion subsystem switch (102) that supports a maximum number of sixty-four enabled communication lanes and is connected to processor (100) and RAM (101). Each I/O adapter socket (110) has a same form factor, supporting sixteen lane I/O adapters. Because each I/O adapter socket (110) supports sixteen lane I/O adapters, each I/O adapter socket (110) is connected to the expansion subsystem switch (102) using a predefined number of sixteen communication lanes.

In the exemplary system of FIG. 5, the expansion subsystem switch (102) has installed upon it a lane configuration module (106). The lane configuration module (106) of FIG. 1 operates generally for dynamically allocating communication lanes for a plurality of I/O adapter sockets in a point-to-point, serial I/O expansion subsystem of a computing system according to embodiments of the present invention by: identifying, during a boot process for the computing system (152), each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102).

In the example of FIG. 5, eight sixteen lane I/O adapters (500) are installed in I/O adapter sockets (110). Specifically, I/O adapter (500a) is installed in socket (110a), I/O adapter (500b) is installed in socket (110b), I/O adapter (500c) is installed in socket (110c), I/O adapter (500d) is installed in socket (110d), I/O adapter (500e) is installed in socket (110e), I/O adapter (500f) is installed in socket (110f), I/O adapter (500g) is installed in socket (110g), and I/O adapter (500h) is installed in socket (110h). Because there are eight I/O adapters (500) and the maximum link width of each of the I/O adapters (500) is sixteen lanes, the I/O adapters (500) may utilize a maximum of 128 lanes to communicate with the expansion subsystem switch (102). However, because the switch (102) supports a maximum number of sixty-four enabled communication lanes, the lane configuration module (106) is not able to allocate enough lanes to each of the sockets (110) to support the maximum link width of each of the I/O adapters (500) installed in the sockets (110). As such, the lane configuration module (106) allocates the lanes (112) among the sockets (110) proportionately. Specifically, the lane configuration module (106) enables eight lanes and disables eight lanes from the switch (102) to the socket (110a), enables eight lanes and disables eight lanes from the switch (102) to the socket (110b), enables eight lanes and disables eight lanes from the switch (102) to the socket (110c), enables eight lanes and disables eight lanes from the switch (102) to the socket (110d), enables eight lanes and disables eight lanes from the switch (102) to the socket (110e), enables eight lanes and disables eight lanes from the switch (102) to the socket (110f), enables eight lanes and disables eight lanes from the switch (102) to the socket (110g), and enables eight lanes and disables eight lanes from the switch (102) to the socket (110h). In such a manner, each socket (110) is allocated half of the maximum number of lanes supported by each I/O adapter (500) in each of the sockets (110).

An expansion subsystem switch operating in accordance with the present invention is generally implemented with automated computing machinery. For further explanation, FIG. 6 sets forth a block diagram of automated computing machinery comprising an expansion subsystem switch (102) useful in dynamically allocating communication lanes (112) for a plurality of I/O adapter sockets (110) in a point-to-point, serial I/O expansion subsystem of a computing system according to embodiments of the present invention. The expansion subsystem switch (102) of FIG. 6 includes at least one switch processor (156) as well as random access memory (168) ('RAM') which is connected through a switch bus (160) to switch processor (156) and to other components of the expansion subsystem switch (102).

Stored in RAM (168) is a lane configuration module (106). The lane configuration module (106) is a set of computer program instructions for dynamically allocating communication lanes for a plurality of I/O adapter sockets in a point-to-point, serial I/O expansion subsystem of a computing system according to embodiments of the present invention. The lane configuration module (106) operates generally for dynamically allocating communication lanes for a plurality of I/O adapter sockets in a point-to-point, serial I/O expansion subsystem of a computing system according to embodiments of the present invention by: identifying, during a boot process for the computing system, each of the I/O adapter sockets (110) in which an I/O adapter is installed; determining, for each installed I/O adapter, a maximum link width for that I/O adapter; and enabling, for each of the I/O adapter sockets (110) in which an I/O adapter is installed, a set of communication lanes for communications between the I/O adapter installed in that I/O adapter socket and the expansion subsystem switch (102) in dependence upon the maximum link width for each I/O adapter and the maximum number of enabled communication lanes supported by the expansion subsystem switch (102).

Also stored in RAM (168) are predefined lane allocation rules (602). The predefined lane allocation rules (602) specify instructions for allocating lanes (112) to sockets (110) when the total number of lanes supported by I/O adapters installed in the sockets (110) exceeds the maximum number of enabled lanes supported by the switch (102). For example, predefined lane allocation rules (602) may specify allocating the lanes to each socket (110) in proportion to the number of lanes supported by each of the I/O adapters installed in each of the sockets (110), allocating at least one lane to each I/O adapter socket, allocating the maximum number of lanes to the sockets (110) closest to the switch (102), allocating the maximum number of lanes to the sockets (110) in which primary I/O adapters are installed and any remaining lanes to the sockets (110) in which secondary, redundant I/O adapters are installed, and so on. Readers will note that these exemplary predefined lane allocation rules are for explanation only and not for limitation.

Figure 6:
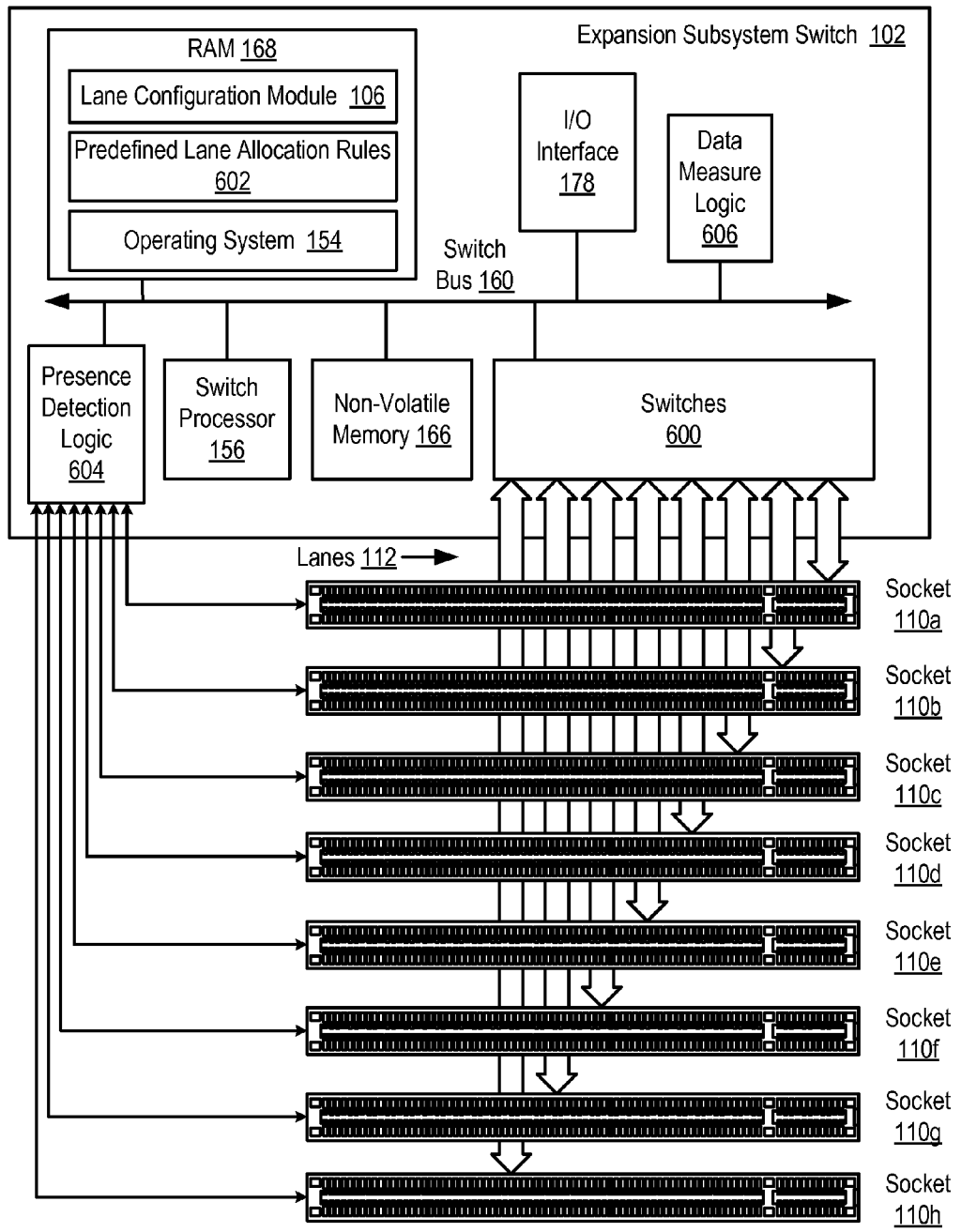
FIG. 6 sets forth a block diagram of automated computing machinery comprising an expansion subsystem switch useful in dynamically allocating communication lanes for a plurality of I/O adapter sockets in a point-to-point, serial I/O expansion subsystem of a computing system according to embodiments of the present invention.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. The operating system (154), the predefined lane allocation rules (602), and the lane configuration module (106) in the example of FIG. 6 are shown in RAM (168), but many components of such software typically are stored in non-volatile memory (166) also. The non-volatile computer memory (166) may be implemented as electrically erasable programmable read-only memory space (so-called 'EEPROM' or 'Flash' memory) or as any other kind of non-volatile computer memory as will occur to those of skill in the art.

The exemplary expansion subsystem switch (102) of FIG. 6 also includes switches (600) controlled by the switch processor (156) executing the lane configuration module (106). The switches (600) are computer hardware such as, for example, multiplexers that enabled or disable the lanes (112) between the expansion subsystem switch (102) and the I/O adapter sockets (110). Enabled lanes form a transmission pathway or communications channel between the I/O adapter and the switch (102), while non-enabled lanes are grounded to reduce signal noise that may be introduced into the enabled lanes. Using switches to enable some of the lanes (112) and disable other lanes allows the lane configuration module (106) to dynamically allocate the communications lanes (112) to the sockets (110).

The exemplary expansion subsystem switch (102) of FIG. 6 also includes presence detection logic (604). The presence detection logic (604) is computer hardware that detects when an I/O adapter is installed in one of the I/O adapter sockets (110). The presence detection logic (604) may detect when an I/O adapter is installed in one of the I/O adapter sockets (110) using a presence detection pin on each of the sockets (110). For example, in embodiments of the present invention that utilize the PCIe family of specifications, the presence detection logic (604) may detect when an I/O adapter is installed in one of the I/O adapter sockets (110) using the 'PRSNT#1' pin of each I/O adapter socket (110). The 'PRSNT#1' pin is a hot-plug present detection pin present in all I/O adapter sockets implemented according to the PCIe specifications.

The exemplary expansion subsystem switch (102) of FIG. 6 also includes data measurement logic (606). The data measurement logic (606) is computer hardware for measuring the number of data packets transmitted through each lane (112) used for data communications between an I/O adapter installed in one of the I/O adapter sockets and the expansion subsystem switch (102). The data measurement logic (506) is connected to the other components of the expansion subsystem switch (152) through the switch bus (160).

The exemplary expansion subsystem switch (102) of FIG. 6 also includes one or more input/output interface adapters (178). The input/output interface adapters (178) in the expansion subsystem switch (102) implement data communications with other components connected to the expansion subsystem switch (102) of a computer system. Other components connected to the expansion subsystem switch (102) of a typical computing system may include, for example, a computer processor, RAM, non-volatile memory, power management components, the real-time system clock, I/O adapters, other computer bus adapters, and so on.

Readers will note that the expansion subsystem switch illustrated in FIG. 6 and useful for dynamically allocating communication lanes for a plurality of I/O adapter sockets in a point-to-point, serial I/O expansion subsystem of a computing system according to embodiments of the present invention is for explanation and not for limitation.

In fact, many of the functions performed by various components in the exemplary expansion subsystem switch of FIG. 6 may be off-loaded to other components of the computing system. For example, the computing system's general purpose processor may be used to execute the lane configuration module and control the switches in the expansion subsystem switch. Readers will also note that other expansion subsystem switches useful according to embodiments of the present invention may contain other component and be configured in other ways as will occur to those of skill in the art.

Figure 7:
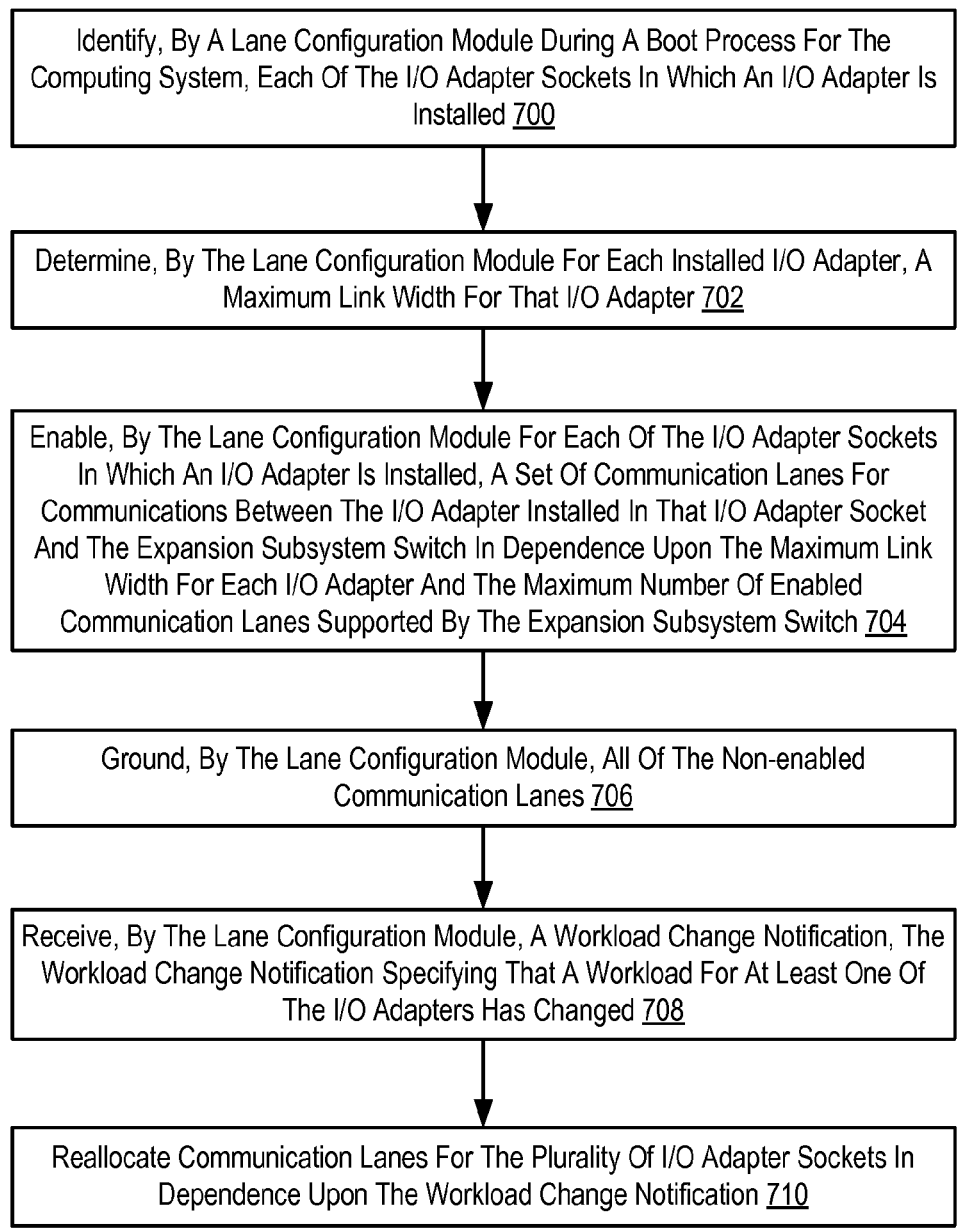
FIG. 7 sets forth a flow chart illustrating an exemplary method for dynamically allocating communication lanes for a plurality of I/O adapter sockets in a point-to-point, serial I/O expansion subsystem of a computing system according to embodiments of the present invention.

FIG. 7 sets forth a flow chart illustrating an exemplary method for dynamically allocating communication lanes for a plurality of I/O adapter sockets in a point-to-point, serial I/O expansion subsystem of a computing system according to embodiments of the present invention. The point-to-point, serial I/O expansion subsystem includes an expansion subsystem switch that supports a maximum number of enabled communication lanes. Each I/O adapter socket has a same form factor, and each I/O adapter socket is connected to the expansion subsystem switch using the same predefined number of communication lanes.

The method of FIG. 7 includes identifying (700), by a lane configuration module during a boot process for the computing system, each of the I/O adapter sockets in which an I/O adapter is installed. The lane configuration module may identify (700) each of the I/O adapter sockets in which an I/O adapter is installed according to the method of FIG. 7 by monitoring a presence detection signal line connected to each I/O adapter socket and determining which sockets' presence detection signal line indicates that an I/O adapter is installed. In other embodiments, the lane configuration module may also identify (700) each of the I/O adapter sockets in which an I/O adapter is installed according to the method of FIG. 7 by polling each I/O adapter socket to see if an I/O adapter is installed, detecting whether a response is received, and identifying sockets from which responses were received as I/O adapter sockets in which an I/O adapter is installed.

The method of FIG. 7 also includes determining (702), by the lane configuration module for each installed I/O adapter, a maximum link width for that I/O adapter. As mentioned above, the maximum link width is the maximum number of lanes supported by the I/O adapter. The lane configuration module may determine (702) a maximum link width for each installed I/O adapter according to the method of FIG. 7 by retrieving the maximum link width from the configuration header for each of the installed I/O adapters. In other embodiments, however, the lane configuration module may determine (702) a maximum link width for each installed I/O adapter according to the method of FIG. 7 by polling each of the lanes provided to each of the sockets in which an I/O adapter is installed to identify the number of lanes that actually connect electrically to the I/O adapter installed in that socket.

The method of FIG. 7 includes enabling (704), by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch. Enabling (704), by the lane configuration module for each of the I/O adapter sockets in which an I/O adapter is installed, a set of communication lanes for communications between the I/O adapter installed in that I/O adapter socket and the expansion subsystem switch is discussed in more detail below with reference to FIGS. 8, 9, and 10.

The method of FIG. 7 also includes grounding (706), by the lane configuration module, all of the non-enabled communication lanes. The lane configuration module may ground (706) all of the non-enabled communication lanes according to the method of FIG. 7 by configuring switches in the expansion subsystem switch to connect the non-enabled lanes to a reference voltage. Readers will note that grounding (706) all of the non-enabled communication lanes may operate to reduce any signal noise introduced in to the enabled communications lanes.

The method of FIG. 7 includes receiving (708), by the lane configuration module, a workload change notification. A workload change notification specifies that a workload for at least one of the I/O adapters has changed. For example, a workload change notification may specify that no pending storage requests exists for a particular storage adapter installed in one of the I/O adapter sockets in the computing system. In another example, a workload change notification may specify that a large number of transmission requests for a particular network adapter installed in one of the I/O adapter sockets are ready for processing. The lane configuration module may receive (708) a workload change notification according to the method of FIG. 7 from an operating system that allocates hardware resources for use by software application and processes hardware resource requests.

The method of FIG. 7 also includes reallocating (710) communication lanes for the plurality of I/O adapter sockets in dependence upon the workload change notification. Reallocating (710) communication lanes for the plurality of I/O adapter sockets in dependence upon the workload change notification according to the method of FIG. 7 may be carried out by reallocating enabled communications lanes from I/O adapter sockets experiencing the least workload to the I/O adapter socket having installed in it the adapter for which the workload change notification message pertains. Reallocating (710) communication lanes for the plurality of I/O adapter sockets in dependence upon the workload change notification according to the method of FIG. 7 may further be carried out by re-establishing the link between the switch and the adapter with the increased number of enabled communications lanes.

Figure 8:
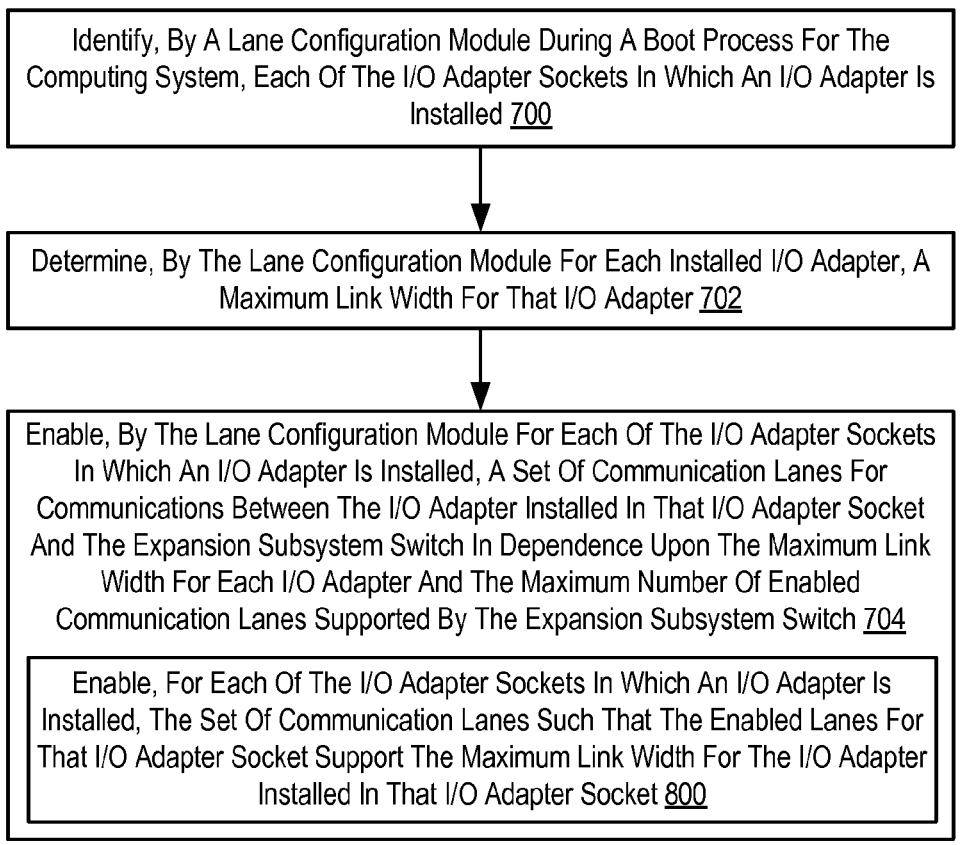
FIG. 8 sets forth a flow chart illustrating a further exemplary method for dynamically allocating communication lanes for a plurality of I/O adapter sockets in a point-to-point, serial I/O expansion subsystem of a computing system according to embodiments of the present invention.

For further explanation of enabling a set of communication lanes for communications between the expansion subsystem switch and each of the I/O adapters installed in an I/O adapter socket, consider FIG. 8 that sets forth a flow chart illustrating a further exemplary method for dynamically allocating communication lanes for a plurality of I/O adapter sockets in a point-to-point, serial I/O expansion subsystem of a computing system according to embodiments of the present invention. The point-to-point, serial I/O expansion subsystem includes an expansion subsystem switch that supports a maximum number of enabled communication lanes. Each I/O adapter socket has the same form factor, and each I/O adapter socket is connected to the expansion subsystem switch using the same predefined number of communication lanes.

The method of FIG. 8 is similar to the method of FIG. 7. That is, the method of FIG. 8 includes: identifying (700), by a lane configuration module during a boot process for the computing system, each of the I/O adapter sockets in which an I/O adapter is installed; determining (702), by the lane configuration module for each installed I/O adapter, a maximum link width for that I/O adapter; and enabling (704), by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch.

In the method of FIG. 8, enabling (704), by the lane configuration module for each of the I/O adapter sockets in which an I/O adapter is installed, a set of communication lanes for communications between the I/O adapter installed in that I/O adapter socket and the expansion subsystem switch includes enabling (800), for each of the I/O adapter sockets in which an I/O adapter is installed, the set of communication lanes such that the enabled lanes for that I/O adapter socket support the maximum link width for the I/O adapter installed in that I/O adapter socket. The lane configuration module may enable (800) a set of communication lanes for each of the I/O adapter sockets according to the method of FIG. 8 using hardware switches in the expansion subsystem switch. For example, consider that the expansion subsystem switch is capable of supporting thirty-two enabled communications lanes and that four eight lane I/O adapters are installed in four sixteen lane I/O adapter sockets. In such an example, the lane configuration module enables eight communications lanes between the switch and each socket in which an eight lane I/O adapter is installed. In such a manner, the lane configuration module enables set of communication lanes for each I/O adapter socket such that the enabled lanes for that I/O adapter socket support the maximum link width for the I/O adapter installed in that I/O adapter socket.

Readers will note that enabling (800), for each of the I/O adapter sockets in which an I/O adapter is installed, the set of communication lanes such that the enabled lanes for that I/O adapter socket support the maximum link width for the I/O adapter installed in that I/O adapter socket according to the method of FIG. 8 is useful in embodiments in which the sum of the maximum link width for each installed I/O adapter is less than or equal to the maximum number of lanes supported by the switch. In some other embodiments, however, the sum of the maximum link width for each installed I/O adapter exceeds the maximum number of lanes supported by the switch. For further explanation, therefore, consider FIG. 9 that sets forth a flow chart illustrating a further exemplary method for dynamically allocating communication lanes for a plurality of I/O adapter sockets in a point-to-point, serial I/O expansion subsystem of a computing system according to embodiments of the present invention. The point-to-point, serial I/O expansion subsystem includes an expansion subsystem switch that supports a maximum number of enabled communication lanes. Each I/O adapter socket has the same form factor, and each I/O adapter socket is connected to the expansion subsystem switch using the same predefined number of communication lanes.

Figure 9:
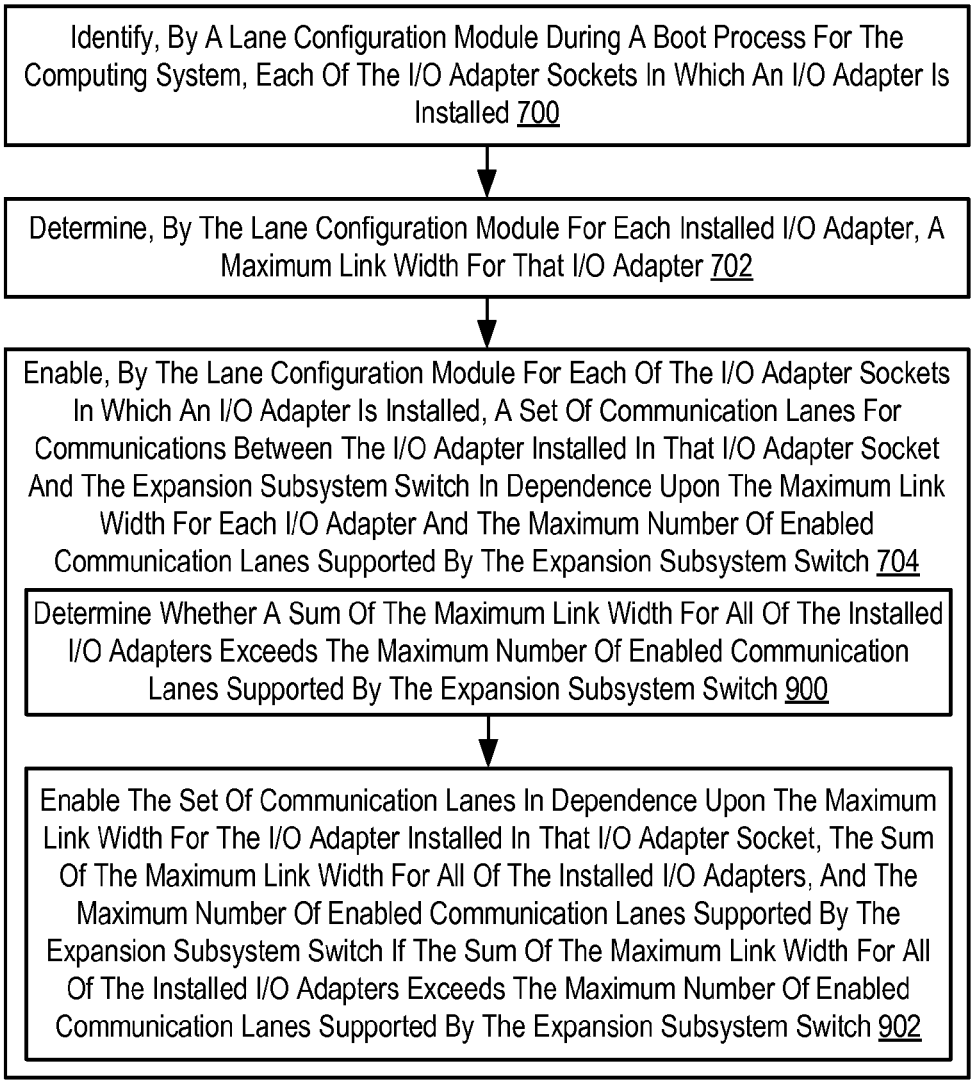
FIG. 9 sets forth a flow chart illustrating a further exemplary method for dynamically allocating communication lanes for a plurality of I/O adapter sockets in a point-to-point, serial I/O expansion subsystem of a computing system according to embodiments of the present invention.

The method of FIG. 9 is similar to the method of FIG. 7. That is, the method of FIG. 9 includes: identifying (700), by a lane configuration module during a boot process for the computing system, each of the I/O adapter sockets in which an I/O adapter is installed; determining (702), by the lane configuration module for each installed I/O adapter, a maximum link width for that I/O adapter; and enabling (704), by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch.

In the method of FIG. 9, enabling (704), by the lane configuration module for each of the I/O adapter sockets in which an I/O adapter is installed, a set of communication lanes for communications between the I/O adapter installed in that I/O adapter socket and the expansion subsystem switch includes determining (900) whether a sum of the maximum link width for all of the installed I/O adapters exceeds the maximum number of enabled communication lanes supported by the expansion subsystem switch. The lane configuration module may determine (900) whether a sum of the maximum link width for all of the installed I/O adapters exceeds the maximum number of enabled communication lanes supported by the expansion subsystem switch according to the method of FIG. 9 by comparing the sum of the maximum link width for all of the installed I/O adapters with the maximum number of enabled communication lanes supported by the expansion subsystem switch. If the sum of the maximum link width for all of the installed I/O adapters is greater than the maximum number of enabled communication lanes supported by the expansion subsystem switch, then the sum of the maximum link width for all of the installed I/O adapters exceeds the maximum number of enabled communication lanes supported by the expansion subsystem switch. Otherwise, the sum of the maximum link width for all of the installed I/O adapters does not exceed the maximum number of enabled communication lanes supported by the expansion subsystem switch.

In the method of FIG. 9, enabling (704), by the lane configuration module for each of the I/O adapter sockets in which an I/O adapter is installed, a set of communication lanes for communications between the I/O adapter installed in that I/O adapter socket and the expansion subsystem switch also includes enabling (902) the set of communication lanes in dependence upon the maximum link width for the I/O adapter installed in that I/O adapter socket, the sum of the maximum link width for all of the installed I/O adapters, and the amount by which the sum of the maximum link width for all of the installed I/O adapters exceeds the maximum number of enabled communication lanes supported by the expansion subsystem switch if the sum of the maximum link width for all of the installed I/O adapters exceeds the maximum number of enabled communication lanes supported by the expansion subsystem switch. The lane configuration module may enable (902) the set of communication lanes for an I/O adapter socket according to the method of FIG. 9 by multiplying the maximum number of enabled communication lanes supported by the expansion subsystem switch with the result of dividing the maximum link width for the I/O adapter installed in that I/O adapter socket by the sum of the maximum link width for all of the installed I/O adapters. For example, consider that the maximum number of enabled communication lanes supported by the expansion subsystem switch is thirty-two lanes, the maximum link width for each of four I/O adapter installed in that I/O adapter socket is sixteen lanes, and the sum of the maximum link width for all of the installed I/O adapters is sixty-four lanes. In the method of FIG. 9, the lane configuration module may enable (902) the set of communication lanes for an I/O adapter socket according to the following formula:

$$EnabledL_i = (MaxSL)\left(\frac{MaxAL_i}{\sum_{n=0}^{n=NumA-1} MaxAL_n}\right)$$

$$EnabledL_i = (32)\left(\frac{16}{64}\right) = 8 \text{ lanes}$$

where $EnabledL_i$ is the number of enabled communications lanes for a particular I/O adapter, MaxSL is the maximum number of enabled communication lanes supported by the expansion subsystem switch, $MaxAL_i$ is the maximum link width for the particular I/O adapter installed in one of the I/O adapter sockets, and NumA is the number of I/O adapters installed in the I/O adapters sockets connected to the switch. In the example above, the number of enabled communications lanes for each of the I/O adapters is eight lanes.

As mentioned above, a lane configuration module may enable a set of communication lanes for communications between the expansion subsystem switch and each I/O adapter installed in an I/O adapter socket in dependence upon predefined lane allocation rules. For further explanation, consider FIG. 10 that sets forth a flow chart illustrating a further exemplary method for dynamically allocating communication lanes for a plurality of I/O adapter sockets in a point-to-point, serial I/O expansion subsystem of a computing system according to embodiments of the present invention. The point-to-point, serial I/O expansion subsystem includes an expansion subsystem switch that supports a maximum number of enabled communication lanes. Each I/O adapter socket has the same form factor, and each I/O adapter socket is connected to the expansion subsystem switch using the same predefined number of communication lanes.

Figure 10:
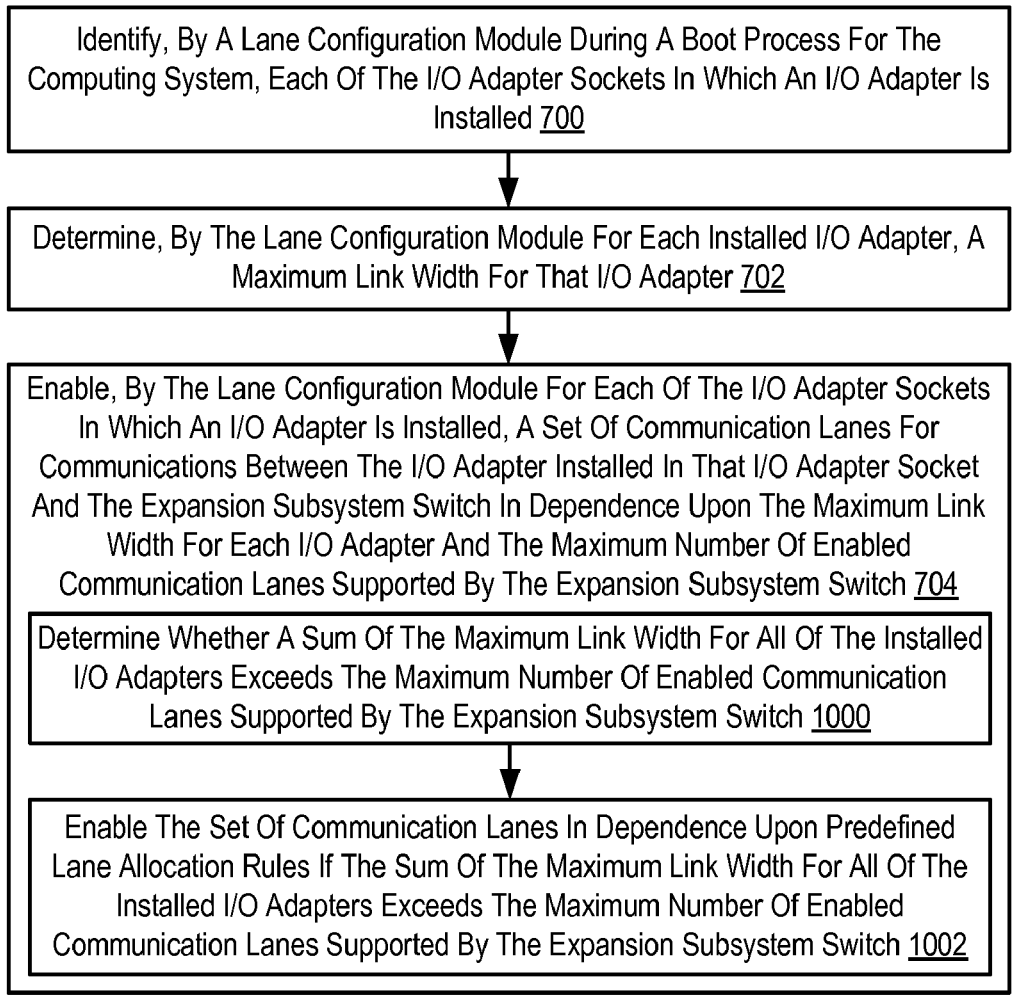
FIG. 10 sets forth a flow chart illustrating a further exemplary method for dynamically allocating communication lanes for a plurality of I/O adapter sockets in a point-to-point, serial I/O expansion subsystem of a computing system according to embodiments of the present invention.

The method of FIG. 10 is similar to the method of FIG. 7. That is, the method of FIG. 10 includes: identifying (700), by a lane configuration module during a boot process for the computing system, each of the I/O adapter sockets in which an I/O adapter is installed; determining (702), by the lane configuration module for each installed I/O adapter, a maximum link width for that I/O adapter; and enabling (704), by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch.

In the method of FIG. 10, enabling (704), by the lane configuration module for each of the I/O adapter sockets in which an I/O adapter is installed, a set of communication lanes for communications between the I/O adapter installed in that I/O adapter socket and the expansion subsystem switch includes determining (1000) whether a sum of the maximum link width for all of the installed I/O adapters exceeds the maximum number of enabled communication lanes supported by the expansion subsystem switch. The lane configuration module may determine (1000) whether a sum of the maximum link width for all of the installed I/O adapters exceeds the maximum number of enabled communication lanes supported by the expansion subsystem switch according to the method of FIG. 10 by comparing the sum of the maximum link width for all of the installed I/O adapters with the maximum number of enabled communication lanes supported by the expansion subsystem switch. If the sum of the maximum link width for all of the installed I/O adapters is greater than the maximum number of enabled communication lanes supported by the expansion subsystem switch, then the sum of the maximum link width for all of the installed I/O adapters exceeds the maximum number of enabled communication lanes supported by the expansion subsystem switch. Otherwise, the sum of the maximum link width for all of the installed I/O adapters does not exceed the maximum number of enabled communication lanes supported by the expansion subsystem switch.

In the method of FIG. 10, enabling (704), by the lane configuration module for each of the I/O adapter sockets in which an I/O adapter is installed, a set of communication lanes for communications between the I/O adapter installed in that I/O adapter socket and the expansion subsystem switch also includes enabling (1002) the set of communication lanes in dependence upon predefined lane allocation rules if the sum of the maximum link width for all of the installed I/O adapters exceeds the maximum number of enabled communication lanes supported by the expansion subsystem switch. As mentioned above, predefined lane allocation rules specify instructions for allocating lanes to sockets when the total number of lanes supported by I/O adapters installed in the sockets exceeds the maximum number of enabled lanes supported by the switch. For example, predefined lane allocation rules may specify allocating the lanes to each socket in proportion to the number of lanes supported by each of the I/O adapters installed in each of the sockets, allocating at least one lane to each I/O adapter socket, allocating the maximum number of lanes to the sockets closest to the switch, allocating the maximum number of lanes to the sockets in which primary I/O adapters are installed and any remaining lanes to the sockets in which secondary, redundant I/O adapters are installed, and so on. The lane configuration module may enable (1002) the set of communication lanes in dependence upon predefined lane allocation rules according to the method of FIG. 10 configuring switches of the expansion subsystem switch in accordance with one or more of the predefined lane allocation rules.

Exemplary embodiments of the present invention are described largely in the context of a fully functional computer system for dynamically allocating communication lanes for a plurality of I/O adapter sockets in a point-to-point, serial I/O expansion subsystem of a computing system. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically allocating communication lanes for a plurality of input/output ('I/O') adapter sockets in a point-to-point, serial I/O expansion subsystem of a computing system, the point-to-point, serial I/O expansion subsystem including an expansion subsystem switch that supports a maximum number of enabled communication lanes, each I/O adapter socket having a same form factor, each I/O adapter socket connected to the expansion subsystem switch using a same predefined number of communication lanes, the method comprising:

identifying, by a lane configuration module during a boot process for the computing system, each of the I/O adapter sockets in which an I/O adapter is installed;

determining, by the lane configuration module for each installed I/O adapter, a maximum link width for that I/O adapter; and enabling, by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch;

wherein enabling, by the lane configuration module for each of the I/O adapter sockets in which an I/O adapter is installed, a set of communication lanes further comprises;

determining whether a sum of the maximum link width for all of the installed I/O adapters exceeds the maximum number of enabled communication lanes supported by the expansion subsystem switch; and enabling set of communication lanes in dependence on the maximum link width for the I/O adapter installed in that I/O adapter socket, the sum of the maximum link width for all of the installed I/O adapters, and the maximum number of enabled communication lanes supported by the expansion subsystem switch if the sum of the maximum link width for all of the installed I/O adapters exceeds the maximum number of enabled communication lanes supported by the expansion subsystem switch.

2. The method of claim 1 wherein enabling, by the lane configuration module for each of the I/O adapter sockets in which an I/O adapter is installed, a set of communication lanes further comprises enabling, for each of the I/O adapter sockets in which an I/O adapter is installed, the set of communication lanes such that the enabled lanes for that I/O adapter socket support the maximum link width for the I/O adapter installed in that I/O adapter socket.

3. The method of claim 1 wherein enabling, by the lane configuration module for each of the I/O adapter sockets in which an I/O adapter is installed, a set of communication lanes further comprises:

determining whether a sum of the maximum link width for all of the installed I/O adapters exceeds the maximum number of enabled communication lanes supported by the expansion subsystem switch; and enabling the set of communication lanes in dependence upon predefined lane allocation rules if the sum of the maximum link width for all of the installed I/O adapters exceeds the maximum number of enabled communication lanes supported by the expansion subsystem switch.

4. The method of claim 1 further comprising grounding, by the lane configuration module, all of the non-enabled communication lanes.

5. The method of claim 1 further comprising:

receiving, by the lane configuration module, a workload change notification, the workload change notification specifying that a workload for at least one of the I/O adapters has changed; and reallocating communication lanes for the plurality of I/O adapter sockets in dependence upon the workload change notification.

6. A computing system for dynamically allocating communication lanes for a plurality of I/O adapter sockets in a point-to-point, serial I/O expansion subsystem of the computing system, the point-to-point, serial I/O expansion subsystem including an expansion subsystem switch that supports a maximum number of enabled communication lanes, each I/O adapter socket having a same form factor, each I/O adapter socket connected to the expansion subsystem switch using a same predefined number of communication lanes, the computing system comprising a processor and a computer memory operatively coupled to the processor, the computer memory having disposed within it computer program instructions capable of:

identifying, by a lane configuration module during a boot process for the computing system, each of the I/O adapter sockets in which an I/O adapter is installed;

determining, by the lane configuration module for each installed I/O adapter, a maximum link width for that I/O adapter; and enabling, by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch;

wherein enabling, by the lane configuration module for each of the I/O adapter sockets in which an I/O adapter is installed, a set of communication lanes further comprises;

determining whether a sum of the maximum link width for all of the installed I/O adapters exceeds the maximum number of enabled communication lanes supported by the expansion subsystem switch; and enabling the set of communication lanes in dependence upon the maximum link width for the I/O adapter installed in that I/O adapter socket, the sum of the maximum link width for all of the installed I/O adapters, and the maximum number of enabled communication lanes supported by the expansion subsystem switch if the sum of the maximum link width for all of the installed I/O adapters exceeds the maximum number of enabled communication lanes supported by the expansion subsystem switch.

7. The computing system of claim 6 wherein enabling, by the lane configuration module for each of the I/O adapter sockets in which an I/O adapter is installed, a set of communication lanes further comprises enabling, for each of the I/O adapter sockets in which an I/O adapter is installed, the set of communication lanes such that the enabled lanes for that I/O adapter socket support the maximum link width for the I/O adapter installed in that I/O adapter socket.

8. The computing system of claim 6 wherein enabling, by the lane configuration module for each of the I/O adapter sockets in which an I/O adapter is installed, a set of communication lanes further comprises:

determining whether a sum of the maximum link width for all of the installed I/O adapters exceeds the maximum number of enabled communication lanes supported by the expansion subsystem switch; and enabling the set of communication lanes in dependence upon predefined lane allocation rules if the sum of the maximum link width for all of the installed I/O adapters exceeds the maximum number of enabled communication lanes supported by the expansion subsystem switch.

9. The computing system of claim 6 wherein the computer memory has disposed within it computer program instructions capable of grounding, by the lane configuration module, all of the non-enabled communication lanes.

10. The computing system of claim 6 wherein the computer memory has disposed within it computer program instructions capable of:

receiving, by the lane configuration module, a workload change notification, the workload change notification specifying that a workload for at least one of the I/O adapters has changed; and reallocating communication lanes for the plurality of I/O adapter sockets in dependence upon the workload change notification.

11. A computer program product for dynamically allocating communication lanes for a plurality of I/O adapter sockets in a point-to-point, serial I/O expansion subsystem of a computing system, the point-to-point, serial I/O expansion subsystem including an expansion subsystem switch that supports a maximum number of enabled communication lanes, each I/O adapter socket having a same form factor, each I/O adapter socket connected to the expansion subsystem switch using a same predefined number of communication lanes, the computer program product disposed upon a computer readable recordable medium, the computer program product comprising computer program instructions capable of:

identifying, by a lane configuration module during a boot process for the computing system, each of the I/O adapter sockets in which an I/O adapter is installed;

determining, by the lane configuration module for each installed I/O adapter, a maximum link width for that I/O adapter; and enabling, by the lane configuration module for each of the I/O adapter sockets in which an I/O adapter is installed, a set of communication lanes for communications between the I/O adapter installed in that I/O adapter socket and the expansion subsystem switch in dependence upon the maximum link width for each I/O adapter and the maximum number of enabled communication lanes supported by the expansion subsystem switch;

wherein enabling, by the lane configuration module for each of the I/O adapter sockets in which an I/O adapter is installed, a set of communication lanes further comprises:

determining whether a sum of the maximum link width for all of the installed I/O adapters exceeds the maximum number of enabled communication lanes supported by the expansion subsystem switch; and enabling the set of communication lanes in dependence upon the maximum link width for the I/O adapter installed in that I/O adapter socket, the sum of the maximum link width for all of the installed I/O adapters, and the maximum number of enabled communication lanes supported by the expansion subsystem switch if the sum of the maximum link width for all of the installed I/O adapters exceeds the maximum number of enabled communication lanes supported by the expansion subsystem switch.

12. The computer program product of claim 11 wherein enabling, by the lane configuration module for each of the I/O adapter sockets in which an I/O adapter is installed, a set of communication lanes further comprises enabling, for each of the I/O adapter sockets in which an I/O adapter is installed, the set of communication lanes such that the enabled lanes for that I/O adapter socket support the maximum link width for the I/O adapter installed in that I/O adapter socket.

13. The computer program product of claim 11 wherein enabling, by the lane configuration module for each of the I/O adapter sockets in which an I/O adapter is installed, a set of communication lanes further comprises:

determining whether a sum of the maximum link width for all of the installed I/O adapters exceeds the maximum number of enabled communication lanes supported by the expansion subsystem switch; and enabling the set of communication lanes in dependence upon predefined lane allocation rules if the sum of the maximum link width for all of the installed I/O adapters exceeds the maximum number of enabled communication lanes supported by the expansion subsystem switch.

14. The computer program product of claim 11 further comprising computer program instructions capable of grounding, by the lane configuration module, all of the non-enabled communication lanes.

15. The computer program product of claim 11 further comprising computer program instructions capable of:

receiving, by the lane configuration module, a workload change notification, the workload change notification specifying that a workload for at least one of the I/O adapters has changed; and reallocating communication lanes for the plurality of I/O adapter sockets in dependence upon the workload change notification.

* * * * *